(12) United States Patent
Wikner et al.

(10) Patent No.: US 8,943,922 B2
(45) Date of Patent: Feb. 3, 2015

(54) TRANSMISSION CREEPER INTERLOCK

(75) Inventors: Aaron D. Wikner, Cedar Falls, IA (US); Thomas G. Ore, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 295 days.

(21) Appl. No.: 13/055,547

(22) PCT Filed: Jul. 24, 2008

(86) PCT No.: PCT/US2008/009005
§ 371 (c)(1), (2), (4) Date: Mar. 8, 2011

(87) PCT Pub. No.: WO2010/011203
PCT Pub. Date: Jan. 28, 2010

(65) Prior Publication Data
US 2012/0079907 A1    Apr. 5, 2012

(51) Int. Cl.
B60K 20/00 (2006.01)
F16H 63/36 (2006.01)

(52) U.S. Cl.
CPC ........................... *F16H 63/36* (2013.01)
USPC ................................. 74/473.25; 74/473.24

(58) Field of Classification Search
CPC ......... F16H 61/22; F16H 59/10; F16H 61/24; F16H 63/36
USPC ....................................................... 74/473.25
See application file for complete search history.

(56) References Cited

U.S. PATENT DOCUMENTS

| | | | | |
|---|---|---|---|---|
| 2,920,504 A | * | 1/1960 | Sommer | 74/745 |
| 4,068,537 A | * | 1/1978 | Wolfe | 74/473.11 |
| 4,432,251 A | * | 2/1984 | Malott | 74/337.5 |
| 4,619,153 A | * | 10/1986 | Lasoen | 74/473.11 |
| 4,944,197 A | * | 7/1990 | Stine et al. | 74/473.26 |
| 5,197,581 A | * | 3/1993 | Czarnecki et al. | 192/62 |
| 5,285,694 A | * | 2/1994 | Chene | 74/473.24 |
| 5,291,799 A | * | 3/1994 | Seaman | 74/473.21 |
| 5,297,453 A | * | 3/1994 | Chene | 74/473.24 |
| 5,544,541 A | * | 8/1996 | Kruizenga et al. | 74/473.24 |

(Continued)

FOREIGN PATENT DOCUMENTS

| | | |
|---|---|---|
| DE | 1530602 | 8/1965 |
| GB | 2280232 | 7/1994 |

OTHER PUBLICATIONS

European Search Report, Dated: Jul. 4, 2011, 5 pgs.

*Primary Examiner* — David M Fenstermacher
*Assistant Examiner* — Zakaria Elahmadi
(74) *Attorney, Agent, or Firm* — Quarles & Brady LLP

(57) ABSTRACT

A shift rail interlock system is disclosed for a transmission assembly having a gear unit with a plurality of selectable gear ratios. The interlock system includes three shift rails that are each movable to select between respective gear ranges. Two of the shift rails cooperate to define a plane. The third shift rail is a creeper rail located in a position that is out of the plane defined by the first and second shift rails. The interlock system includes a creeper interlock that is moveable between lock and release positions, which respectively prevent and permit movement of the creeper rail. The interlock system also includes a range rail interlock that is moveable between two different lock and release positions. The range rail interlock is coupled to the creeper interlock such that when one of the range rails or the creeper rail is in the engaged position, the others are in their respective locked out positions.

20 Claims, 4 Drawing Sheets

(56) References Cited

U.S. PATENT DOCUMENTS

| | | | |
|---|---|---|---|
| 5,737,969 A * | 4/1998 | Brown et al. | 74/473.25 |
| 6,035,738 A * | 3/2000 | Huggins et al. | 74/473.37 |
| 6,745,878 B1 * | 6/2004 | Jensen | 192/3.63 |
| 7,093,511 B2 * | 8/2006 | Norum et al. | 74/335 |
| 7,963,182 B2 * | 6/2011 | Wright | 74/335 |

* cited by examiner

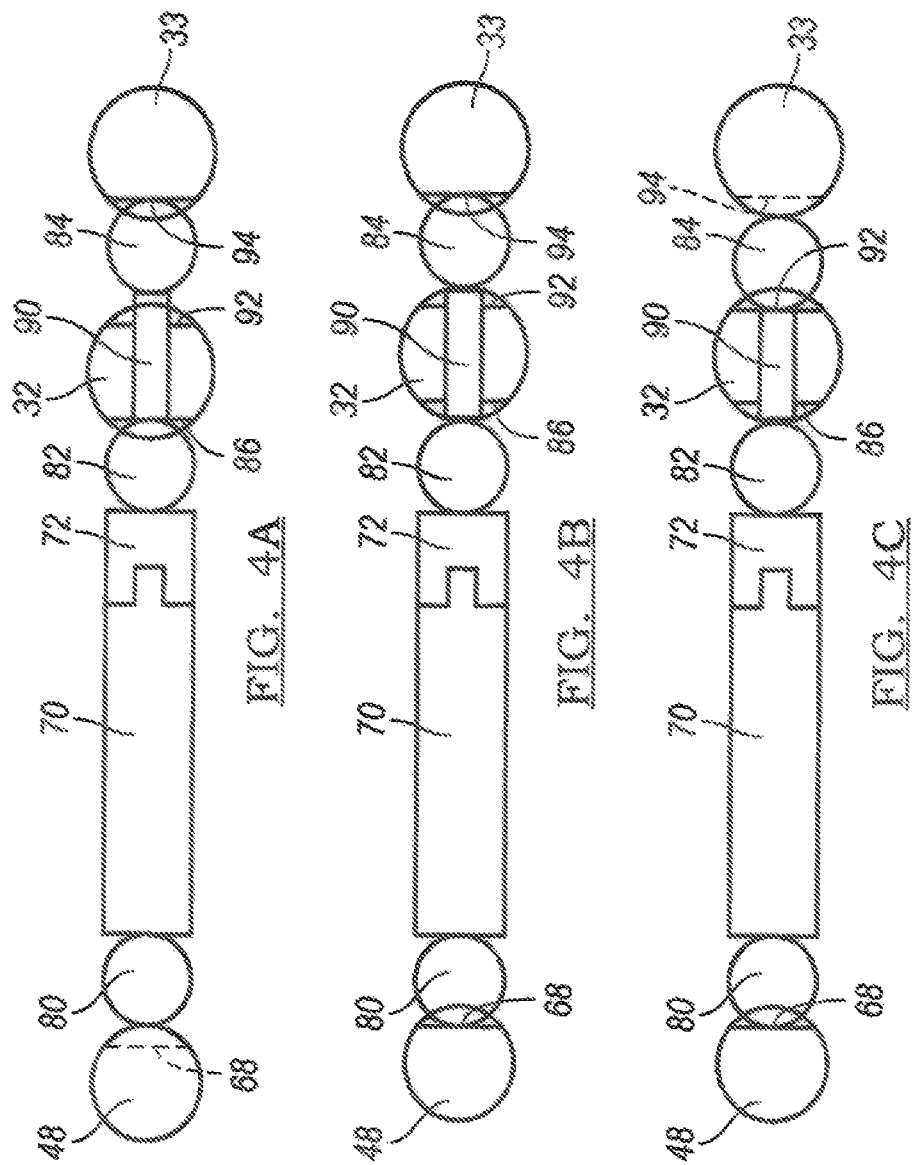

TRANSMISSION CREEPER INTERLOCK

BACKGROUND

1. Field of the Invention

The present invention generally relates to transmission assemblies, and more particularly to a transmission assembly interlock system that prevents the engagement of more than one of shift rail at any given time. Even more specifically, this invention is a three-way, shift rail interlock system that only allows engagement of one of three shift rails, and where one of the shift rails is a creeper rail that is located out of plane with the other shift rails.

2. Description of Related Technology

In the field of transmission assemblies, manually operated, synchronized transmissions include a pair of shift rails that are moved in order to select a gear ratio of the transmission. In a typical construction, an interlock ball and an interlock pin cooperate with a pair of co-planar shift rails to prevent both shift rails from being engaged simultaneously. (For three co-planar shift rails, two interlock balls and an interlock pin would be used.) Large transmissions, such as those available on commercial agricultural tractors, are often provided with a third shift rail known as a creeper rail. The creeper rail is a shift rail that allows for the transmission to be shifted into the lowermost ranges of the transmission. With the known constructions, however, there is no known mechanism by which an interlock is provided to couple the creeper rail with the two other, non-creeper shift rails (hereinafter, for clarity, "range rails"), such that engagement of only one of the range rails or the creeper rail is possible at any given point in time.

U.S. Pat. No. 6,745,878 to Jensen, discloses a shift rail assembly where an interlock is provided between a pair of range rails of the transmission. The range rails each have interlock grooves that interact with a pair of interlock balls. While typically retained in a locked position, an interlock member is capable of engaging both interlock balls and holding them in interlock grooves of each of the range rails to prevent engagement of either or both range rails. The interlock member is also moveable to a release position where it is disengaged from both interlock balls. In this position, the interlock balls will allow one of the range rails to be engaged, but not the other. The interlock member is biased towards the locked position and a linkage couples the interlock member to a clutch pedal. Thus, movement of the clutch pedal to its disengaged position causes the interlock member to move into its release position. Notably, this construction fails to disclose an interlock between the range rails and a creeper rail of the transmission assembly A problem associated with coupling the range rails to the creeper rail is that the creeper shift rail is typically located in position that is spaced away from the range rails. Complicating this even further is the fact that the creeper rail is typically positioned out of plane from the range rails and that other components of the transmission assembly are typically located between the creeper rail and the range rails. As such, the creeper rail is not accessible via a direct line from the range rails.

In view of the above, it is apparent that there exists a need for a three-way interlock of a transmission assembly; the interlock only allowing for engagement of one of three shift rails, one of the shift rails being a creeper rail, at any given point in time.

SUMMARY

In satisfying the above need, as well as overcoming the enumerated drawbacks and other limitations of the related art, the present invention provides a shift rail interlock system for a transmission assembly having a gear unit with a plurality of selectable gear ratios. The transmission assembly includes three shift rails that are each movable to select between respective gear ranges and a disengaged position. Two of the shift rails, the range rails, cooperate to define a plane. The third shift rail, a creeper rail, is located in a position out of the plane defined by the first two shift rails and may or may not be parallel to the range rails. The interlock system includes a creeper interlock that is moveable between lock and release positions, which respectively prevent and permit engagement of the creeper rail. The interlock system also includes a range rail interlock having first and second interlock balls or members associated with the first and second range rails. The first interlock ball is moveable between first rail lock and release positions, while the second interlock ball is moveable between lock and release position for both range rails. The range rail interlock is coupled to the creeper interlock such that when one of the interlock ball or the creeper interlock member is in its release position, the others are in their respective lock positions.

Accordingly, in one aspect the present invention is a transmission assembly having a gear unit with a plurality of selectable gear ratios, an interlock system and the assembly: a first range rail movable to select between a first pair of gear ranges and a disengaged position; a second range rail movable to select between a second pair of gear ranges and a disengaged position, the first and second range rails being generally parallel to one another and generally defining a plane; a creeper rail movable to select between at least one creeper gear range and a disengaged position, the creeper rail being located in a position out of the plane defined by the first and second shift rails; a creeper interlock being moveable between a creeper lock position and a creeper release position, in the creeper lock position the creeper interlock preventing movement of the creeper rail, in the creeper release position the creeper interlock permitting movement of the creeper rail; a range rail interlock including a first member moveable between a first rail lock position and a first rail release position, and a second member moveable between a second rail lock position and a second rail release position; and the creeper interlock being coupled to the range rail interlock such that when one of the creeper rail and the range rails is the engaged position, the other of the creeper rail and range rails is in a disengaged position and locked out by the creeper or range rail interlocks.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 4A is a schematic illustration of the position of the interlock system when the creeper rail is engaged;

FIG. 4B is a schematic illustration of the position of the interlock system when the second range rail is engaged; and FIG. 4C is a schematic illustration of the position of the interlock system when the first range rail is engaged.

DETAILED DESCRIPTION

Figure 1:
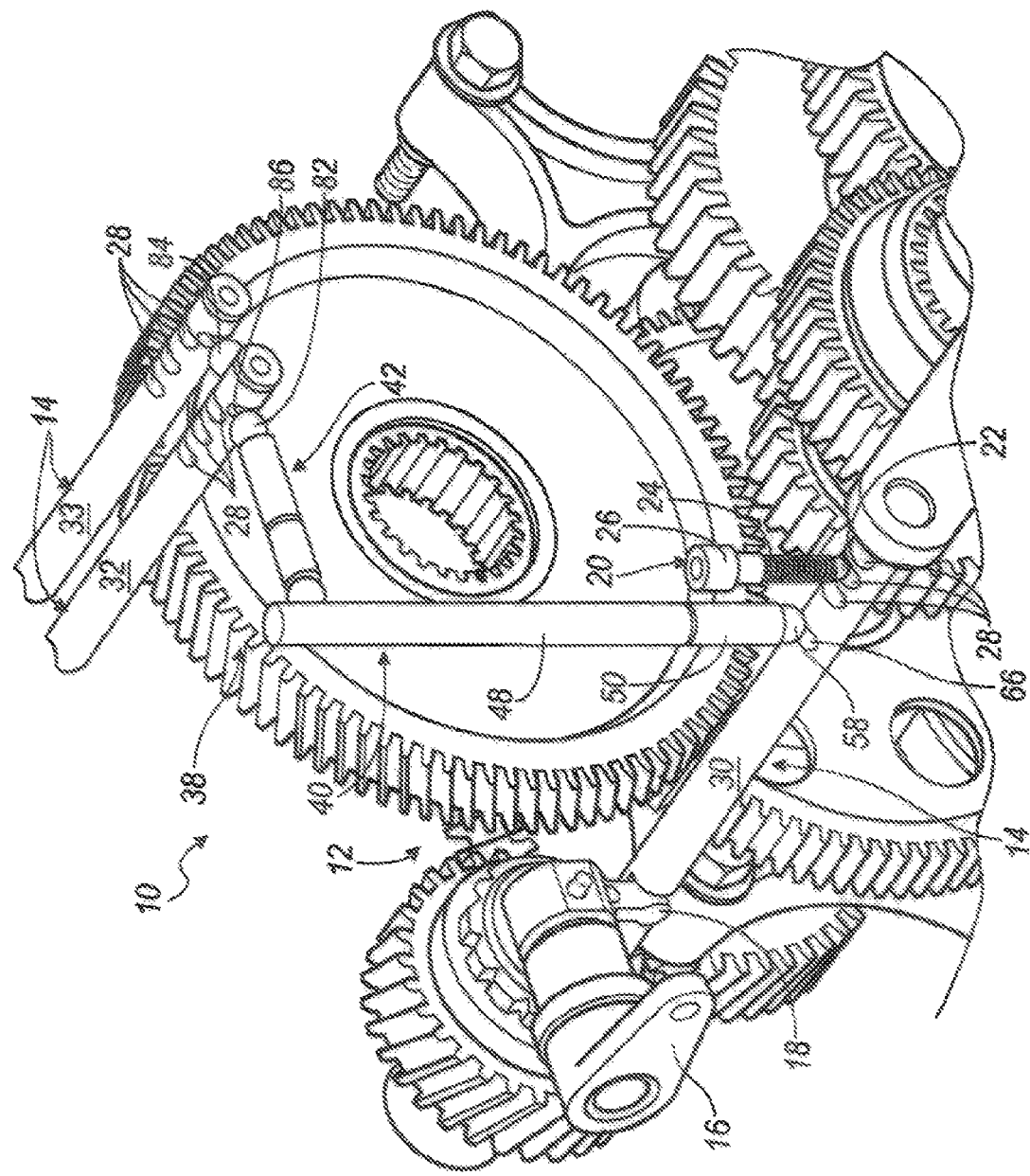
FIG. 1 is a diagrammatic perspective view of a portion of a transmission assembly embodying the principles of the present invention having an interlock system.

Referring now to the drawings, a transmission assembly having an interlock system and embodying the principles of the present invention is generally illustrated therein and designated at 10. As its primary components, the transmission assembly 10 includes a gear unit 12 and a plurality of shift rails 14 that allow the transmission assembly 10 to shift between various gear ranges in the gear unit 12.

The shift rails 14 are coupled to shift levers 16, one being shown in FIG. 1, that are controlled by the operator of the vehicle to selectively move the associated shift rail 14 between one or more of the ranges associated therewith and a disengaged position. The shift levers 16 may be manually, electrically or hydraulically actuated depending on the specific construction provided in the vehicle. The shift lever 16 includes a pawl 18 or other member that engages and interacts with the shift rail 14 so as to cause axial sliding of the shift rail 14 during the movement of the shift lever 16. This movement of the shift rail 14 is typically between one of three positions, two of the positions are engaged positions representing two different gear ranges associated with the particular shift rail 14. The third position is a disengaged position where the shift rail is not in either of the engaged positions.

To retain the shift rails 14 in one of their possible positions, the shift rails 14 include a detent assembly 20. The detent assembly 20 may be of any conventional construction. One such construction includes a detent ball 22 biased into engagement with the shift rail 14 by a spring 24 and set screw 26. The ball 22 is urged by the spring into engagement with grooves or recesses 28 formed in the shift rail 14. Since the shift rail has three positions, three recesses 28 are formed in the shift rail 14, two of which correspond to the engaged positions of the shift rail 14 and one of which, typically a middle recess 28 of the three, corresponds to the disengaged position of the shift rail 14. Thus, as seen in FIG. 1, the lowermost or farthest left shift rail in the figure is in its released position.

Transmission assemblies to which the present invention has particular utility include large transmissions on commercial vehicles, such as agricultural tractors. Such transmission assemblies are often provided with a gear that can provide a significant amount of torque or power at very slow speeds. This gear is commonly known as a creeper gear. The creeper gear itself may also have an associated set of gear ranges. These gear ranges are controlled by a shift rail herein referred to as the creeper rail 30. In addition to the creeper rail 30, these transmission assemblies 10 typically include at least two other shift rails 14, which, in the interest of clarity, are herein referred to as range rails 32 and 33.

The range rails 32, 33 and creeper rail 30 are supported in the transmission assembly 10, and more particularly a transmission housing 34, so as to be axially slidable therein upon actuation of the shift levers 16 respectively associated with each rail. Most often, the range rails 32 are located generally adjacent and parallel to one another, typically in an upper portion of the transmission assembly 10 (upper being in reference to the normal operational position of the tractor) such that the range rails 32, 33 cooperate to define a plane 36 through their longitudinal axes. The creeper rail 30, however, is not located within the plane 36 defined by the range rails 32, 33 and, as such, is located in a position remote from range rails 32, 33.

To prevent damage to the transmission assembly 10, it is preferable that the transmission assembly include an interlock system that prevents two shift rails 14 from being in the engaged position at the same time. The present invention provides an interlock system, generally designated at 38, that couples the remotely located creeper rail 30 with the range rails 32, 33 so that only one of these shift rails 14 may be engaged at any point in time.

The interlock system 38 includes two principal subassemblies, a creeper interlock 40 coupled to and cooperating with a range rail interlock 42. The interlocks 40, 42 are generally located at an angle with respect to one another, this angle being approximately 90 degrees in the illustrated drawings, but other angles also being possible. The range rail interlock 42 extends in a passageway 44 defined in the housing 34 of the transmission assembly 10 and is generally located in the plane 36 defined by the range rails 32, 30 so as to extend laterally or orthogonally away from the range rails 32, 33. The creeper interlock 40 similarly extends laterally or orthogonally away from the creeper rail 30 in a passageway 46 defined in the housing 34 of the transmission assembly 10. This passageway 46 extends such that it generally intersects the passageway 44 within which the range rail interlock 42 is received.

Figure 2:
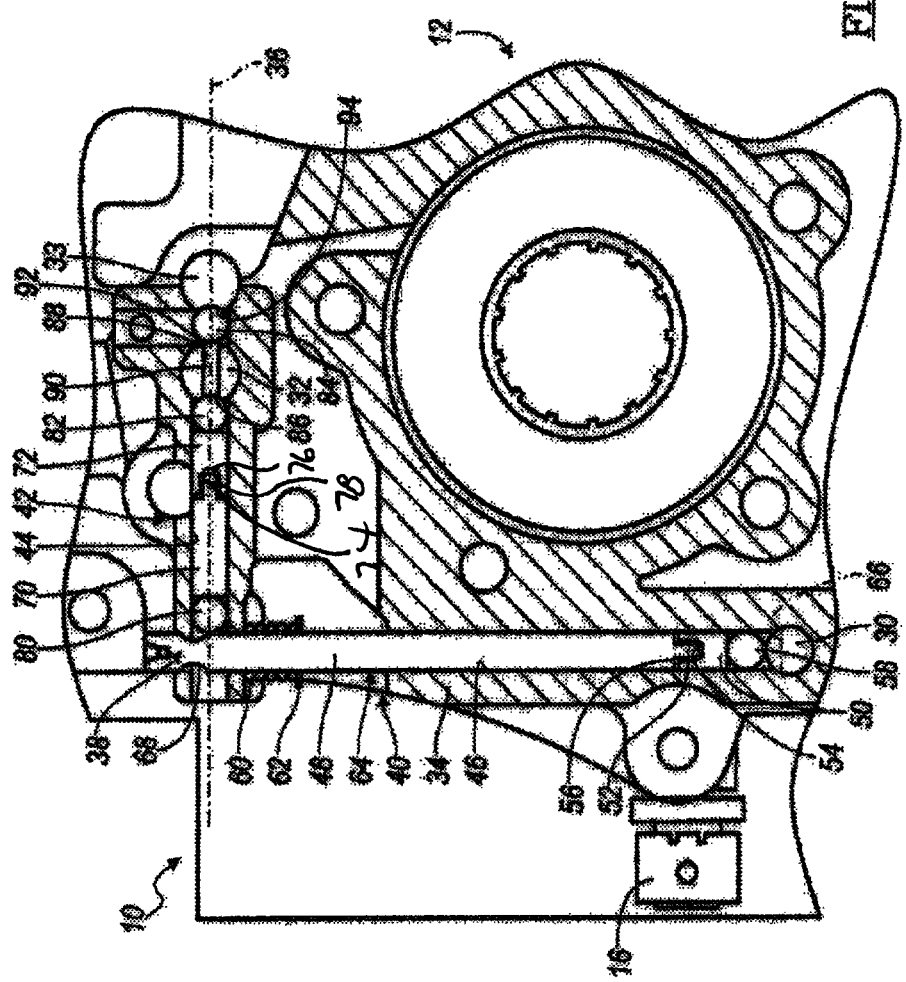
FIG. 2 is a diagrammatic elevational view of the portion of the transmission assembly seen in FIG. 1 when the creeper rail is engaged (the creeper interlock being released) and the range rails are in their locked positions.
Figure 3:
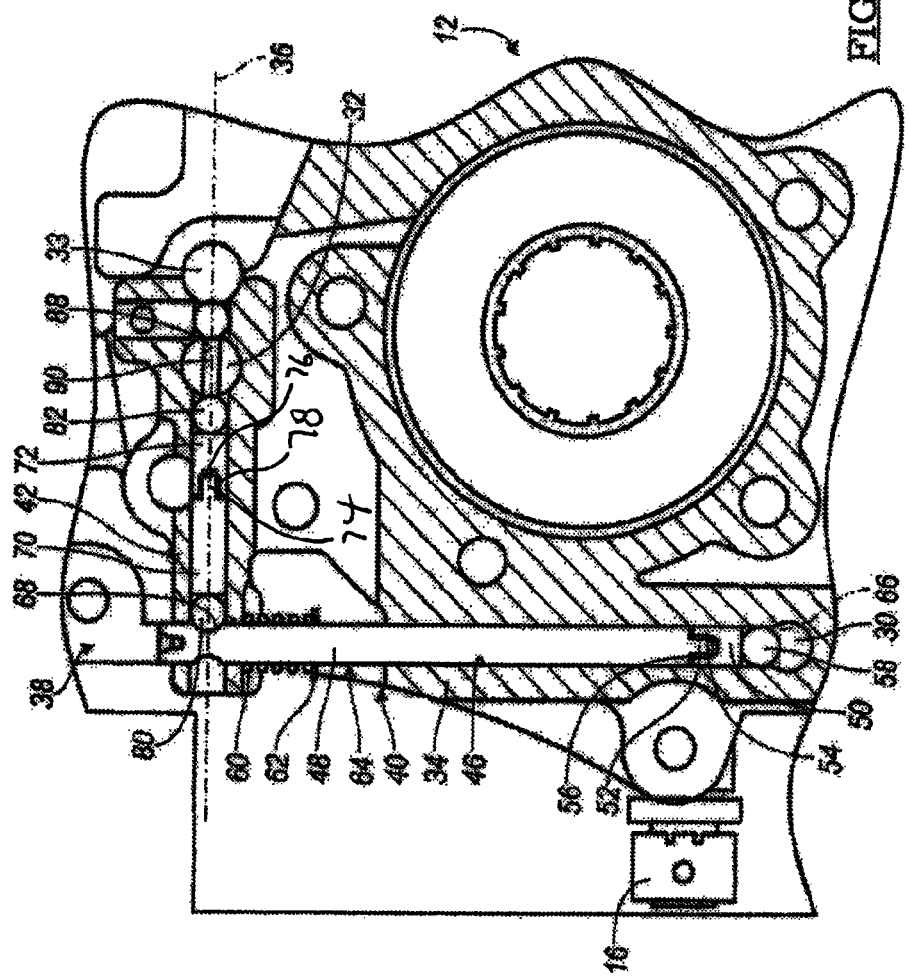
FIG. 3 is a diagrammatic elevational view of the portion of the transmission assembly seen in FIG. 1 when the creeper rail is locked and either of the range rails are in their engaged positions.

The creeper interlock 40 includes a shaft or shaft assembly that is comprised of a primary shaft 48 and a secondary shaft 50. The primary shaft 48 has a length that is greater than the secondary shaft 50 and is provided at its proximal end with a protrusion or other engagement feature 52 that is received within a corresponding recess or other engagement feature 54 of the secondary shaft 50. A benefit achieved by providing two shafts 48, 50 is this construction allows for control during assembly via shimming and positioning of the creeper interlock 40 so as to ensure that only one of the three rails is engaged at a time, while still allowing for reasonable manufacturing tolerances. The shims 56 are seen in FIGS. 2 and 3 as being located between the primary and secondary shafts 48, 50, about the engagement feature 52 of the primary shaft 48 and adjacent an end face of engagement feature 54 of the secondary shaft 50. While primary and secondary shafts 48, 50 are illustrated as forming the shaft of the creeper interlock 40, the shafts 48, 50 could alternatively be provided as a single unitary member if very tight manufacturing tolerances were held in all related parts.

Located within the passageway 46, in a position between the secondary shaft 50 and creeper rail 30, is a creeper ball 58. In order to bias the creeper ball 58 into engagement with the creeper rail 30, a spring or other biasing feature is provided in association with the shaft assembly of the creeper interlock 40. In the illustrated construction, a coil spring 60 is located about the portion of the primary shaft 48 so as to urge the primary shaft 48 in the direction of the creeper rail 30. To achieve this biasing force, the spring 60 bears against a portion of the housing 34 of the transmission assembly 10 and on a ring 62, such as a snap ring, 62, axially fixed on the exterior surface 64 of the primary shaft 48. When the creeper rail 40 is in its disengaged position (the ball 22 of the detent assembly 20 being located in the groove 28 associated with the disengaged position), a groove or recess 66 correspondingly formed in the creeper rail 30 is located such that the creeper ball 58 is urged, via the shafts 48, 50 and the spring 60, into the groove 66. This urging by the spring 60 causes the shafts 48, 50 to be biased toward the creeper rail 30. Formed on the end of the primary shaft 48, opposite the creeper rail 30, is another groove/recess 68, which is preferably provided circumferentially about the primary shaft 48. The groove 68 is located on the primary shaft 48 such that the creeper ball 58 is located within its corresponding groove 66, and therefore the creeper rail is in its released position, the groove 68 will be aligned with the passageway 44 within which the range rail interlock 42 is received.

In a construction similar to the creeper interlock 40, the range rail interlock 42 includes a shaft assembly comprising a primary shaft 70 and a secondary shaft 72, the latter being shorter than the primary shaft 70. Additionally, the primary shaft 70 of the range rail interlock 42 includes a protrusion or engagement feature 74 that is received within a recess or engagement feature 76 of the secondary shaft 72. Again, shims 78 will are employed to allow for assembly of the range rail interlock 42 to within the required tolerances.

Located within the passageway 44, between the primary shaft 48 of the creeper interlock 40 and the primary shaft 70 of the of the range rail interlock 42 is an intermediate ball 80. When the groove 68 of the primary shaft 48 of the creeper interlock 40 is aligned with the passageway 44 within which the range rail interlock 42 is received, the intermediate ball 80 can be received within the groove 68.

Also located within the passageway 44 between the shafts 70, 72 and the first range rail 32, is a first interlock ball 82. The first range rail 32 include a recess 86 that is located so as to be able to receive the first interlock ball 82 when the first range rail 32 is in its disengaged position.

Associated with the recess 86 formed in the first range rail 32, is a transverse bore 88 within which is provided a translatable pin 90. Notably, the pin 90 has a length that is longer than the bore 88. The bore 88, and therefore the pin 90, cooperates with another recess 92 that is diametrically opposed to the recess 86. Received within the passageway 46, between the range rails 32, 33 and engageable with the recess 92 is a second interlock ball 84. An additional recess 94 is formed on the second range rail 33 generally opposite recesses 92. When the second range rail 33 is in its disengaged position, the recess 94 is aligned so as to be able to receive the second interlock ball 84 therein.

The above described construction is such that only one of the shift rails 14 can be engaged at any given point in time and such that all of the shift rails 14 must be in the disengaged position before any of the shift rails 14 can be moved into their respective engaged positions.

The relative positioning of interlocks 40, 42 during engagement of either the creeper rail 30 or range rails 32, 33, is generally illustrated in FIGS. 2-4C. More specifically, FIGS. 2 and 4A illustrate the position of the interlocks 40, 42 when the creeper rail 30 is engaged in either of its engaged positions. FIG. 4B illustrates the relative positions of the interlocks 40, 42 when the first range rail 32 is engaged in either of its engaged positions. FIG. 4C illustrates the relative positioning of the interlocks 40, 42 when the second range rail 33 is engaged in either of its engaged positions. FIG. 3 also generically shows the latter two positionings.

As seen in FIG. 4A, as well as FIG. 2, when the creeper rail 30 is engaged, the creeper ball 58 is forced out of the recess 66 in the creeper rail 30. This causes the primary and secondary shafts 48, 50 to be directed against the portion of the spring 60, thereby moving recess 68 out of alignment with the passageway 44 within which the range rail interlock 42 is received. With the recess 68 misaligned as such, the intermediate ball 80 is not received within the recess 68 of the primary shaft 48. When the intermediate ball 80 is not received in the recess 68, the remaining portions of the range rail interlock 42 are required to shift toward the range rails 32, 33. In order to achieve this, the range rails 32, 33 must be positioned such that their recesses 86, 90 are aligned with the passageway 44 and can respectively receive the first and second interlock balls 82, 84. More specifically, the primary and secondary shafts 70, 72 of the range rail interlock 42 will cause the first interlock ball 82 to be received within the recess 86 of the first range rail 42. This in turn will cause the pin 90 to translate within the bore 88 forcing a second interlock ball 82 into the recess 90 of the second range rail 33. Thus, before the creeper rail 30 can be moved into its engaged position, the range rails must be in their disengaged positions, where they can be locked out by the interlock 42.

The reverse situation to FIG. 4A is illustrated in FIG. 4C, wherein the second range rail 33 is engaged and the creeper rail 30 and the first range rail 32 are disengaged and locked out. In that instance, the second range rail 33 is positioned such that its recess 94 is not aligned with the passageway 44. This causes the second interlock ball 84 to be forced toward the first range rail 32, where it is received in the recess 92 of the first range rail 32, thereby locking out the first range rail 32. With the second interlock ball 84 within the recess 92, the pin 90 is translated within the bore 80 in the direction of the first interlock ball 82, forcing the first interlock ball 82 in the direction of the creeper interlock 40. This in turn causes the secondary and primary shafts 72, 70 to translate in the passageway 44 and to cause the intermediate ball 82 to be moved into the recess 68 on the end of the primary shaft 48 of the creeper interlock 40. Thus, before the second range rail 33 can be moved into its engaged position, the first range rail 32 and the creeper rail 30 must be in their disengaged positions so that they may be locked out by the interlocks 40, 42.

The final situation, where the first range rail 32 is engaged and the creeper rail 30 and the second range rail 33 are locked out, is seen in FIG. 4B and generally represented in FIG. 3. In this position, the first range rail 32 is located such that in neither the first nor second interlock ball 82,84 is aligned with or can be received within either of the recesses 86 or 92 in the first range rail 32. As a result, the second interlock ball 84 will received with in the recess 94 of the second range rail 33 thereby locking out the second range rail 33. Similarly, the first interlock ball 82 is directed toward the creeper interlock 30 causing the secondary and primary shafts 72, 70 to move the intermediate ball 80 into the recess 68 formed in the end of the primary shaft 48 of the creeper interlock 40. With the intermediate interlock ball 80 received within the recess 68, the creeper interlock ball 58 is received within the recess 66 formed in the creeper rail 30, thereby locking out the creeper rail 30.

As seen from the above discussion, in order for any of the shift rails 14 to be moved into an engaged position, all of the shift rails 44 must first be in their disengaged positions such that all of the corresponding recesses are aligned with the corresponding interlock balls. Upon movement of one of the shift rails 14 into an engaged position, this causes movement of the creeper interlock 40 and the range rail interlock 42 such that the other of the two shift rails 14 become locked in their disengaged position by virtue of the receipt of the ball in the corresponding recess thereof.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. An interlock system for a transmission assembly having a gear unit with a plurality of selectable gear ratios, the interlock system comprising:
a first range rail with at least one first rail recess, the first range rail being movable between at least one engaged position and a disengaged position, the at least one engaged position of the first range rail corresponding to a selection by the first range rail of at least a first of the selectable gear ratios;
a second range rail with at least one second rail recess, the second range rail being movable between at least one engaged position and a disengaged position, the at least one engaged position of the second range rail corresponding to a selection by the second range rail of at least a second of the selectable gear ratios, the first and second range rails being generally parallel to one another and generally defining a plane;
a creeper rail with at least one creeper rail recess, the creeper rail being moveable between at least one engaged position and a disengaged position, the at least one engaged position of the creeper rail corresponding to a selection of at least a third of the selectable gear ratios by the creeper rail, the creeper rail being located in a position out of the plane defined by the first and second range rails;
a creeper interlock with at least one creeper interlock recess, the creeper interlock being moveable between a creeper lock position and a creeper release position, in the creeper lock position a first portion of the creeper interlock extending into the at least one creeper rail recess to lock the creeper rail in the disengaged position, in the creeper release position the creeper interlock permitting movement of the creeper rail from the disengaged position to the at least one engaged position;
a range rail interlock including a first interlock member moveable between a first rail lock position, at which the first interlock member extends into the at least one first rail recess to lock the first range rail in the disengaged position, and a first rail release position, at which the first interlock member permits movement of the first range rail from the disengaged position to the at least one engaged position, the range rail interlock further including a second interlock member moveable between a second rail lock position, at which the second interlock member extends into the at least one second rail recess to lock the second range rail in the disengaged position, and a second rail release position, at which the second interlock member permits movement of the second range rail between the disengaged position and the at least one engaged position;
wherein, said creeper interlock is mechanically coupled to the range rail interlock such that, when the creeper interlock is in the creeper release position, the first and second interlock members are positioned, respectively, in the first and second rail lock positions; and
wherein, only one of the first range rail, the second range rail, and the creeper rail may be positioned in its respective engaged position at a time.

2. The interlock system of claim 1 wherein the creeper interlock includes a creeper interlock member, in the creeper lock position the creeper interlock member being received within a recess formed in the creeper rail, and in the creeper release position the creeper interlock member being located out of the recess in the creeper rail.

3. The interlock system of claim 1 wherein the first interlock member is located within a recess in the first range rail in the first rail lock position.

4. The interlock system of claim 1 wherein the second interlock member is located within a recess in the second range rail in the second rail lock position.

5. The interlock system of claim 1 wherein the creeper interlock is obliquely oriented with respect to the range rail interlock.

6. The interlock system of claim 5 wherein the creeper interlock is generally perpendicularly oriented with respect to the range rail interlock.

7. The interlock system of claim 1 wherein the creeper interlock includes a shaft engaging a creeper interlock member, the shaft member including a circumferential groove formed in an end located opposite of the creeper interlock member, the shaft further being moveably biased in a direction toward the creeper rail.

8. The interlock system of claim 7 wherein the range rail interlock includes a shaft engaging the first interlock member, the shaft also engaging an intermediate interlock member, the intermediate interlock member being moveable between a position received within the groove on the shaft of the creeper interlock and a position located out of the groove on the shaft of the creeper interlock.

9. The interlock system of claim 8 wherein the range rail interlock is received in a passageway defined in the transmission assembly and the shaft of the creeper interlock extends through the passageway.

10. The interlock system of claim 8 wherein the creeper interlock is received in a passageway defined in the transmission assembly and the shaft of the range rail interlock extends through the passageway.

11. The interlock system of claim 8 wherein the shaft of the range rail interlock is defined by multiple shaft segments.

12. The interlock system of claim 8 wherein the intermediate interlock member is a ball.

13. The interlock system of claim 7 wherein the shaft of the creeper interlock is defined by multiple shaft segments.

14. The interlock system of claim 7 wherein the creeper interlock member of the creeper interlock is a ball.

15. The interlock system of claim 1 wherein the first interlock member is engageable with a pin extending through the first range rail, the pin being engageable with the second interlock member.

16. The interlock system of claim 1 wherein the first and second interlock members are balls.

17. An interlock system for a transmission assembly having a gear unit with a plurality of selectable gear ratios, the interlock system comprising:
a first range rail being movable between a disengaged position and at least one engaged position, the first range rail including at least one first rail recess;
a second range rail being movable between a disengaged position and at least one engaged position, the second range rail including at least one second rail recess, the first and second range rails being generally parallel to one another and generally defining a plane;
a creeper rail being moveable between a disengaged position and at least one engaged position, the creeper rail being oriented out of the plane defined by the first and second range rails, the creeper rail including at least one creeper rail recess;
a creeper interlock being moveable between a creeper lock position and a creeper release position, the creeper interlock extending from a first end in contact with the creeper rail towards the plane defined by the first and second range rails, the creeper interlock including at least one creeper interlock recess removed from the first end of the creeper interlock; and a range rail interlock including a first rail interlock member moveable between a first rail lock position corresponding to the disengaged position of the first range rail and a first rail release position corresponding to the at least one engaged position of the first range rail, the first rail interlock member extending into the at least one first rail recess when in the first rail lock position to lock the first range rail in the disengaged position, the range rail interlock also including a second rail interlock member moveable between a second rail lock position corresponding to the disengaged position of the second range rail and a second rail release position corresponding to the at least one engaged position of the second range rail, the second rail interlock member extending into the at least one second rail recess when in the second rail lock position to lock the second range in the disengaged position, the range rail interlock extending between a first end in contact with the creeper interlock and one or more of the first and the second rail interlock members;

wherein, when the first range rail is in the at least one engaged position, the first range rail prevents the second rail interlock member from moving from the second rail lock position to the second rail release position, such that the second rail interlock member prevents the second range rail from moving to the at least one engaged position, and when the second range rail is in the at least one engaged position, the second range rail urges the second rail interlock member into the at least one first rail recess, such that the second rail interlock member prevents the first range rail from moving to the at least one engaged position;

wherein, when the creeper rail is in the disengaged position, the first end of the creeper interlock extends into the creeper rail recess to prevent the creeper rail from moving to the at least one engaged position, the creeper interlock recess being thereby aligned for the first end of the range rail interlock to extend into the creeper interlock recess, the range rail interlock thereby permitting one of the first and the second range rail interlock members to move, respectively, from the first or second rail lock position to the first or second rail release position such that one of the first and second range rails, respectively, may move to the respective at least one engaged position; and wherein, when the creeper rail is in the at least one engaged position, the first end of the creeper interlock does not extend into the creeper rail recess, the creeper interlock recess being thereby aligned so as not to receive the first end of the range rail interlock, the creeper interlock thereby causing the range rail interlock to lock the first and the second rail interlock members, respectively, in the first and the second rail lock positions, the first and second rail interlock members thereby locking each of the first and second range rails in the respective disengaged position.

18. The interlock system of claim 17, wherein the first rail interlock member is located to one side of the first range rail; wherein the second rail interlock member is located to a different side of the first range rail; and wherein a rail interlock connecting member extends through the first range rail to transmit motion from the first rail interlock member to the second rail interlock member.

19. The interlock system of claim 17, wherein one or more of the first rail interlock member, the second rail interlock member, the first end of the range rail interlock, and the first end of the creeper interlock includes an interlock ball.

20. An interlock system for a transmission assembly having a gear unit with a plurality of selectable gear ratios, the interlock system comprising:

a first range rail being movable between a disengaged position and at least one engaged position, the first range rail including at least one first rail recess;

a second range rail being movable between a disengaged position and at least one engaged position, the second range rail including at least one second rail recess, the first and second range rails being generally parallel to one another and generally defining a plane;

a creeper rail being moveable between a disengaged position and at least one engaged position, the creeper rail being oriented out of the plane defined by the first and second range rails, the creeper rail including at least one creeper rail recess;

a creeper interlock being moveable between a creeper lock position and a creeper release position, the creeper interlock extending from a first end in contact with the creeper rail towards the plane defined by the first and second range rails, the creeper interlock including at least one creeper interlock recess removed from the first end of the creeper interlock; and a range rail interlock including a first rail interlock member moveable between a first rail lock position corresponding to the disengaged position of the first range rail and a first rail release position corresponding to the at least one engaged position of the first range rail, the range rail interlock also including a second rail interlock member moveable between a second rail lock position corresponding to the disengaged position of the second range rail and a second rail release position corresponding to the at least one engaged position of the second range rail, the range rail interlock extending between a first end in contact with the creeper interlock and one or more of the first and the second rail interlock members;

wherein, when the first range rail is in the at least one engaged position, the first range rail prevents the second rail interlock member from moving to the second rail release position, and when the second range rail is in the at least one engaged position, the second rail interlock member prevents the first range rail from moving to the at least one engaged position;

wherein, when the creeper rail is in the disengaged position, the first end of the creeper interlock extends into the creeper rail recess, the creeper interlock recess being thereby aligned to receive the first end of the range rail interlock, the range rail interlock thereby permitting one of the first and the second range rail interlock members to move, respectively, from the first or second rail lock position to the first or second rail release position;

wherein, when the creeper rail is in the at least one engaged position, the first end of the creeper interlock does not extend into the creeper rail recess, the creeper interlock recess being thereby aligned so as not to receive the first end of the range rail interlock, the range rail interlock thereby locking the first and the second rail interlock members, respectively, in the first and the second rail lock positions;

wherein, when the first end of the creeper interlock extends into the creeper rail recess, the creeper interlock recess and the first and the second rail interlock members are aligned along a line within the plane; and wherein, when the first and the second range rails are in their respective disengaged positions, the first and the second rail interlock members, and the at least one first and second rail recesses are aligned along the line within the plane.

* * * * *